Feb. 13, 1962  G. M. GROENENDYKE  3,021,074
ELECTRONIC TRIODE BRIDGE MULTIPLIER
Filed May 8, 1957  2 Sheets-Sheet 1

United States Patent Office 3,021,074
Patented Feb. 13, 1962

3,021,074
ELECTRONIC TRIODE BRIDGE MULTIPLIER
Goethe M. Groenendyke, Dallas, Tex., assignor, by mesne assignments, to Socony Mobil Oil Company, Inc., New York, N.Y., a corporation of New York
Filed May 8, 1957, Ser. No. 657,841
8 Claims. (Cl. 235—194)

This invention relates to computer circuits and more particularly to improvements in electronic circuits for multiplying quantities represented by electrical signals. It is an object of the present invention to provide a simple and operationally inexpensive multiplier circuit.

Many forms of electronic circuits have been proposed for performing the operation of multiplying functions. One well-known multiplying circuit includes a ring modulator. The modulator modulates a carrier and an input voltage by functioning as a double-pole, double-throw switch. A second voltage is also introduced into the multiplier circuit. The product of the two voltages and the carrier are then applied to a demodulator which suppresses the carrier and provides an output voltage proportional to the two signals or voltages.

In accordance with the present invention, there is provided a simple bridge circuit which avoids the need of a carrier and a demodulator and provides a simple, inexpensive and accurate means for multiplying two functions. More particularly, the multiplier of the present invention includes a bridge circuit having four branches. A non-linear element having square-law characteristics is included in each of the branches. The non-linear elements are connected in series. By rendering all of the elements conductive during multiplying operation and for both positive and negative excursions of the input signals, there is produced in an output circuit a voltage proportional to the product of the two input voltages.

For accurate operation, each of the non-linear elements should possess substantially identical characteristics. While new elements selected for a circuit may have the desired characteristics, the process of testing and selecting desired elements is tedious and expensive. Furthermore, the characteristics may change during the lifetime of the elements, introducing unbalance in the multiplying circuit which in turn renders the circuit inaccurate.

Accordingly, it is another object of the present invention to provide a multiplying circuit of wide dynamic range including means for compensating for variations in the operational characteristics of the elements and to provide a balanced multiplying circuit for the lifetime of the elements.

It is a further object of the present invention to provide a new balancing system for instantaneously compensating for variations in the operational characteristics of the elements involved.

In accordance with this latter aspect of the present invention, there is provided an electronic circuit having at least two space-discharge tubes, each including at least a plate, a grid, and a cathode. The current path through the tubes is by way of the grid-cathode circuit. The operating characteristics of the tubes are rendered substantially identical by a biasing circuit connected to the plates of the tubes. The bias applied to the plates of the tubes is varied to equalize the conductivity characteristics of the tubes.

More particularly, there is provided in accordance with the present invention a circuit for multiplying the magnitudes of two signals and comprising a bridge circuit having four branches. A multielement space-discharge tube having at least a plate, grid, and cathode, is connected in each of the branches with the grid of each tube connected to a cathode of an adjacent tube and to a juncture of the bridge circuit. A first circuit means is provided to apply a first of the signals to the grids of two of the tubes connected in opposite branches of the bridge circuit. A second circuit means is provided to apply a second of the signals to the grids of the other two of the tubes connected in the two remaining opposite branches of the bridge circuit. The characteristics of the tubes are balanced by a network means having at least one input and four outputs. Each of the outputs is connected respectively to a plate of one of the tubes for application of biasing voltages to the plates. Means are included in the network means for adjusting the magnitude of bias voltage applied to each of the plates for equalizing the conductivity characteristics of said tubes. A signal proportional to the product of the first and second signals is developed across an output circuit connected between the first and second circuit means.

For further objects and advantages of the present invention, reference may be had to the following detailed description taken in conjunction with the accompanying drawings in which.

Figure 3:
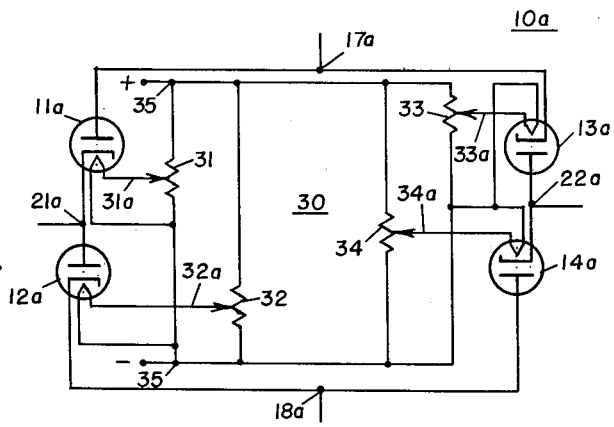

FIG. 3 schematically illustrates one embodiment of the present invention; and

Figure 4:
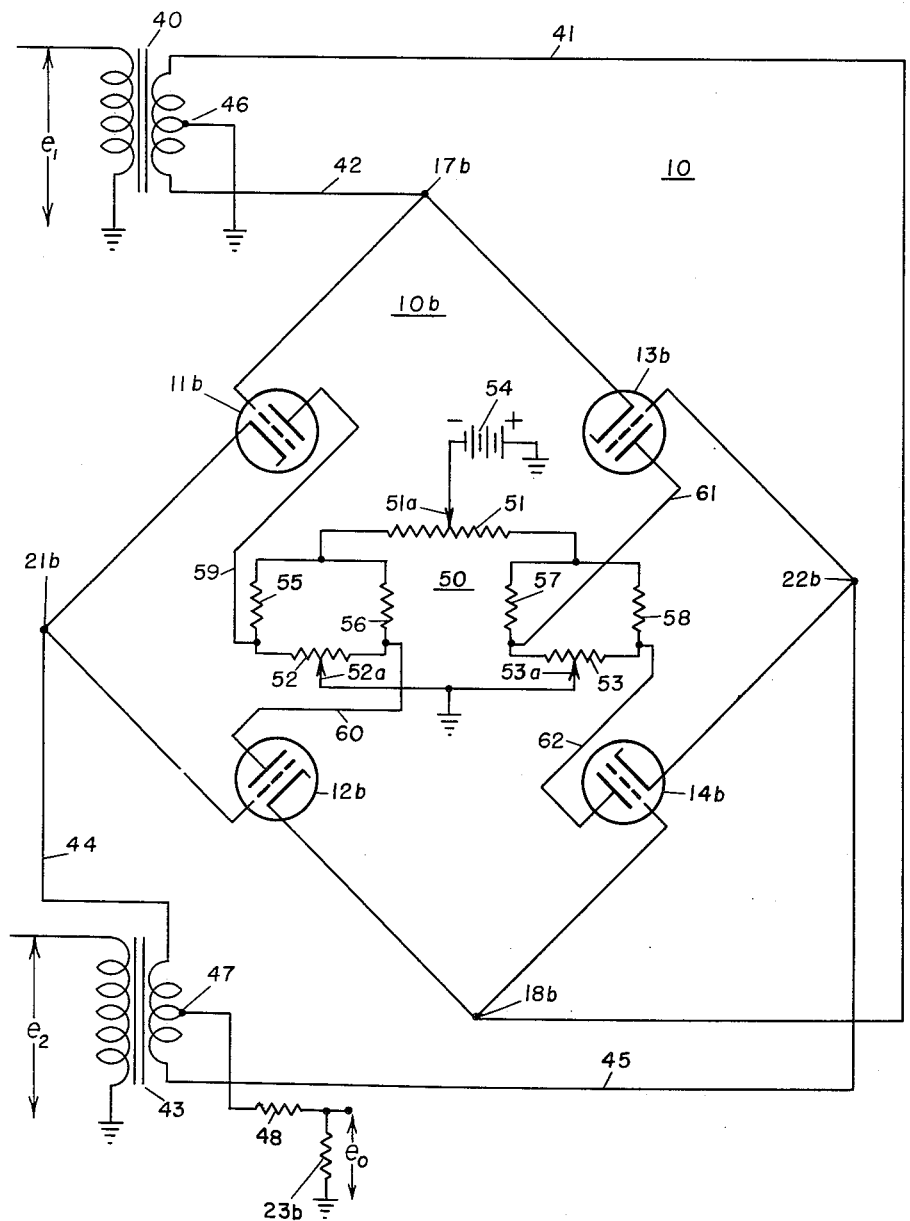

FIG. 4 schematically illustrates a preferred embodiment of the present invention.

Figure 1:
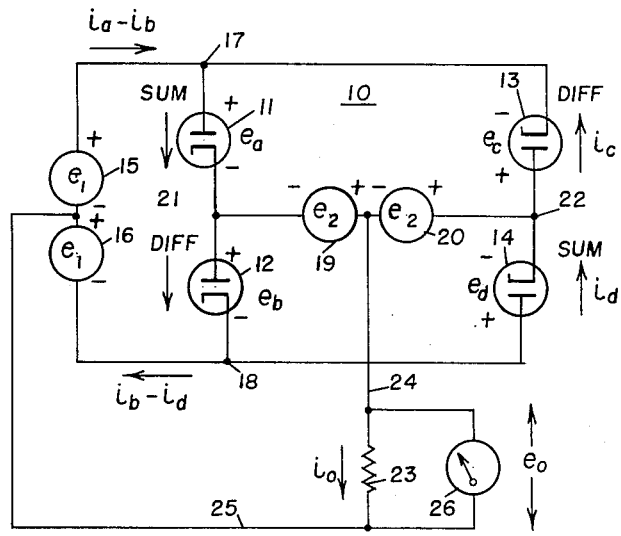
FIG. 1 is a schematic explanatory of the present invention.
Figure 2:
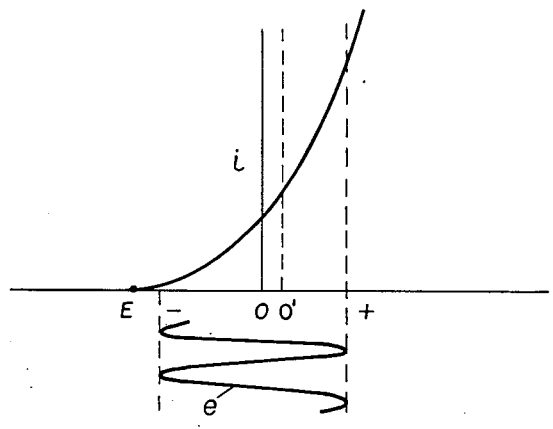
FIG. 2 illustrates the square-law characteristic of elements employed in the present invention.

Referring now to the drawings and more particularly to FIG. 1, the multiplying circuit of the present invention is shown comprising a bridge 10 having in each of its branches non-linear elements 11, 12, 13, and 14. These non-linear elements are diodes having a square-law operating characteristic. It is a requirement of circuit operation that the elements 11–14 conduct during both positive and negative excursions of the input voltage. The desired square-law characteristic and the conduction of the diodes 11–14 is illustrated in FIG. 2. The curve is the plate current-plate voltage characteristic of the non-linear elements. The input voltage $e$ is illustrated as a sinusoidal voltage having both positive and negative excursions. The elements or diodes 11–14 having a cut-off voltage of E are conductive during the application of voltage $e$.

The circuit of FIG. 1 operates in accordance with the well-known quarter-square law. More particularly, the voltages to be multiplied are applied across diagonals of the bridge circuit. For purposes of explaining the operation of the circuit of FIG. 1, the input voltages are each shown supplied by two generators. The input voltage $2e_1$ is provided by serially connected generators 15 and 16 connected to terminals 17 and 18 identifying one diagonal of the bridge 10. The second voltage to be multiplied, $2e_2$, is provided by serially connected generators 19 and 20, each supplying the voltage $e_2$ and connected to terminals 21 and 22, identifying the second diagonal of the bridge 10. The sum of the input voltages appears across the elements 11 and 14. The difference of the voltages appears across the elements 12 and 13.

The output voltage $e_0$, proportional to the product of the voltages $e_1$ and $e_2$, is developed across the resistor 23. One side of the resistor 23 is connected by way of conductor 22 to a tap between the generators 19 and 20. The other side of the resistor 23 is connected by way of conductor 25 to a tap between the generators 15 and 16. The value of the output voltage may be read with a meter 26 connected across the output resistor 23.

The multiplier circuit 10 requires for proper operation diodes having identical square-law characteristics. These characteristics are defined by the equation:

$$(e+E)^2 = Ki \quad (1)$$

Equation 1 is graphically represented by the curve of FIG. 2. The characters of the Equation 1 are identified as follows:

$e$ = The voltage across a diode
$i$ = The current through the diode
$K$ = A constant
$E$ = The cut off voltage of the diode and is a constant.

In operation, all the diodes will conduct at all times. This characteristic plus the square-law characteristic of each of the diodes 11–14 and their connection, renders the circuit capable of performing a multiplying operation. This may be illustrated by considering the voltages across and the currents through the diodes and writing the voltage and current laws for each of the loops included in each of the circuits.

The voltage across and the currents through the diodes 11–13 are, respectively: $e_a$, $i_a$; $e_b$, $i_b$; $e_c$, $i_c$; and $e_d$, $i_d$.

Writing Kirckhoff's voltage law for each of the four loops in FIG. 1, there is obtained:

$$e_0 = e_1 - e_a + e_2 \quad (2)$$
$$e_0 = -e_1 + e_b + e_2 \quad (3)$$
$$e_0 = e_1 + e_c - e_2 \quad (4)$$
$$e_0 = -e_1 - e_d - e_2 \quad (5)$$

Now writing Equation 1 specifically for each of the diodes, there is obtained:

$$(e_a + E)^2 = Ki_a \quad (6)$$
$$(e_b + E)^2 = Ki_b \quad (7)$$
$$(e_c + E)^2 = Ki_c \quad (8)$$
$$(e_d + E)^2 = Ki_b \quad (9)$$

Now substitute Equations 2–5, respectively, into Equations 6–9 to get, respectively:

$$(e_1 + e_2 - e_0 + E)^2 = Ki_a \quad (10)$$
$$(e_1 - e_2 + e_0 + E)^2 = Ki_b \quad (11)$$
$$(-e_1 + e_2 + e_0 + E)^2 = Ki_c \quad (12)$$
$$(-e_1 - e_2 - e_0 + E)^2 = Ki_d \quad (13)$$

The output voltage $e_0$ across resistor 23 is obtained by multiplying the current $i_0$ and the resistance $R23$ of the resistor 23. The current $i_0$ may be expressed as:

$$i_0 = i_a - i_b - i_c + i_d \quad (14)$$

therefore, $$e_0 = (i_a - i_b - i_c + i_d)R23 \quad (15)$$

By substituting Equations 10–13 into Equation 15 and simplifying, the output voltage may be expressed as:

$$e_0 = e_1 e_2 \left[ \frac{1}{E + \frac{K}{8R23}} \right] \quad (16)$$

Since the term within the brackets is constant, the output voltage may be finally written as:

$$e_0 = K e_1 e_2 \quad (17)$$

Any non linear element having the square-law characteristics represented by the curve of FIG. 2 may be employed in practicing the present invention. Diodes of the 6AL5 type have been found suitable.

In order to obtain proper operation and high degree of accuracy, it is desirable that each of the diodes employed in the multiplying circuits have identical characteristics. Many arrangements may be employed for balancing the characteristics of the diodes. One such arrangement is illustrated in the embodiment of FIG. 3. The multiplier 10a of FIG. 3 is again a bridge circuit. Each branch of the bridge circuit includes a diode identified by the reference characters 11a–11b. Each diode has a filament for heating its cathode. By regulating the voltage applied to each of the filaments, the conductivity of the diodes may be closely regulated to obtain the identity of characteristics required for proper operation.

Means for balancing the diodes is provided by a network 30 comprising a plurality of potentiometers 30–34 connected in parallel across a suitable source of D.C. voltage, not shown, by way of terminals 35. Each of the potentiometers 31–34, respectively, includes a movable contact 31a–34a connected to one end of an associated filament. By adjusting the contacts 31a–34a, it is possible to vary the filament voltages applied to the various diodes and thus render the characteristics of the diodes substantially equal.

While this method of balancing the diodes is acceptable, it is rather slow. It takes time for the cathode temperature to become stabilized and for the full effect of the change in voltage to take place. There are times when a faster method of balancing the multiplier circuit will be desired. There are also times when a wider dynamic range of operation for the multiplier circuit may be called for. In multiplying circuit with diodes is meant for operation upon input voltages of a low order of magnitude. The limitation is the value of the voltage E (FIG. 2). The multiplier can only function as such so long as the input voltages to be multiplied do not exceed the value of the voltage E. By effectively moving the ordinate of the graph of FIG. 2 to the right as illustrated by the dotted line, the dynamic range of the multiplying circuit will be increased.

A preferred embodiment of the present invention in which both rapid balancing of the circuit may be obtained and in which a wider range of multiplier action is obtained is illustrated in FIG. 4.

The first quantity, represented by the voltage $e_1$, is applied by way of transformer 40 and conductors 41, 42 to junctures 17b, 18b of the bridge circuit 10b. The second quantity, represented by the voltage $e_2$, is applied by way of transformer 43 and conductors 44 and 45 to junctures 21b and 22b of the bridge circuit 10b. The product of the two quantities is obtained as the voltage $e_0$ at an output circuit comprising the impedance or resistor 23b. The output circuit is connected between the center taps 46 and 47, respectively, of the secondaries of the transformers 40 and 43. Resistor 48 is a conventional current limiting resistor.

In accordance with the present invention, the bridge 10b includes in each of its four branches a multielement space-discharge tube. These tubes 11b, 12b, 13b, and 14b are illustrated as triodes, each having a plate, grid, and cathode. The multielement tubes increase the dynamic range of the multiplier by reason of having characteristic curves whose zero ordinates (FIG. 2) have a position represented by vertical dashed line intersecting the abcissa at O' of FIG. 2. The triodes are connected for diode operation in order to obtain the non-linear square-law characteristic of the diode required for performing the function of multiplication. More specifically, the grids and cathodes of the tubes are connected in series with the current path for each tube being the grid-cathode circuit.

Balanced circuit operation is maintained by a biasing network 50 connected to the plates of the triodes 11b–14b. The balancing or biasing circuit 50 includes three variable impedances 51–53 which for convenience will be referred to as slidewires with the understanding that any physical form of variable impedance including an adjusting contact may be employed. The slidewires 51, 52, and 53 are supplied from a common source of voltage represented by the battery 54. Each of the slidewires 51–53 has an adjustable contact 51a, 52a, and 53a. The contact 51a is connected to one side of the battery 54 and the other contacts 52a and 53a are connected to an opposite side of the battery 54. One end of the slidewire 52 is connected by way of fixed impedance 55 to one end of the slidewire 51. An opposite side of the slidewire 52 is connected by way of fixed impedance 56 to the same end of the slidewire 51. Likewise, one end of the slidewire 53 is connected by way of fixed impedance 57 to the opposite end of the slidewire 51 and the other end of the slidewire 53 is connected by way of fixed impedance 58 to impedance 57 and the opposite end of the slidewire 51.

The voltage applied to the plate of tube 11b by way of conductor 59 is developed by current flow through the left-hand side of the slidewire 52, and the biasing voltage applied to the plate of the tube 12b by way of conductor 60 is developed by current flow through the right-hand side of the slidewire 52. The voltage applied to the plate of tube 13b by way of conductor 61 is developed by current flow through the left-hand side of slidewire 53, and the biasing voltage applied to the plate of tube 14b by way of conductor 62 is developed by current flow through the right-hand side of the slidewire 33.

The bias voltage applied to the plates of the tubes 11b–14b determines their conductivity characteristics. By varying the bias voltage, the conductivity characteristics of the elements 11b–14b may be brought to equality.

The adjustment of one of the contacts 36a–38a simultaneously adjusts the conductivity of more than one of the tubes, thus facilitating the final balance of the bridge. While independent biasing is contemplated, the illustrated network simplifies the balancing of the bridge. For example, the movement of contact 51a adjusts the current flow through all four tubes 11b–14b and brings tubes 11b and 12b toward a state of balance with tubes 13b and 14b. The movement of the contact 52a adjusts the conductivity of tubes 11b and 12b. The movement of contact 53a adjusts the conductivity of tubes 13b and 14b.

In one embodiment of the invention now in use, the potentiometer slidewires 51, 52, and 53 have values of 100K ohms and the resistors 55–58 have values of 47K ohms. The supply or battery 54 has an output of 75 volts. It is to be understood that the values above are given as representative of but one specific arrangement and are not intended as a limitation upon the scope of the present invention.

Balance of the multiplier 10b requires two conditions. One is that the output is zero when one of the voltages $e_1$ or $e_2$ is zero. The other is the suppression of the fundamental frequency of the input signals.

In actual practice the balancing of the bridge 11 may be accomplished by first applying a sinusoidal voltage to only one of the input circuits, for example, to the transformer 40. The output is adjusted to zero by moving the contacts 51a–53a. Now a sinusoidal voltage is applied to both inputs, and the output and one input are applied to opposite deflection electrodes of an oscilloscope. The resulting Lissajous figure will disclose the presence or absence of the fundamental frequency in the output signal. The contacts 51a–53a are adjusted, if necessary, to suppress the fundamental frequency.

This correction and balancing is almost instantaneous and makes feasible the periodic and rapid rebalancing of the multiplying circuit without taking the multiplier out of service for too long a period of time.

It is apparent from the present disclosure that other modifications are possible within the spirit and scope of the present invention. For example, other networks may be devised for balancing the bridge circuit, and it is contemplated that other multielectrode or multielement space-discharge tubes may be employed to perform operations equivalent to those performed by the diodes and triodes disclosed herein.

What is claimed is:

1. An arrangement for multiplying the magnitudes of two signals comprising a bridge circuit having four branches, a triode connected in each of said branches, said triodes being connected in series with a grid of each triode connected to a cathode of an adjacent one of said triodes, a first circuit means for applying a first of said signals to grids of two of said triodes connected in two opposite branches of said bridge circuit, a second circuit means for applying a second of said signals to grids of two more of said triodes connected in the two remaining opposite branches of said bridge circuit, biasing means connected to the plates of said tubes for equalizing the conductivity characteristics of said tubes, and an output circuit connected between said first and second circuit means for development therein of a signal proportional to the product of said first and second input signals.

2. The arrangement of claim 1 in which said biasing means comprises at least three potentiometers, a first of said potentiometers being variable to adjust the conductivity as a group of two tubes of said bridge with respect to the remaining two tubes of said bridge, a second of said potentiometers being variable to adjust the conductivity of the tubes comprising one of said groups, and a third potentiometer being variable to adjust the conductivity of the tubes comprising the remaining of said groups.

3. The arrangement of claim 1 in which said biasing means comprising a variable impedance having movable contact, a source of biasing voltage having one end connected to said movable contact, a first pair of fixed impedances each having one end thereof connected to one end of said variable impedance, a second variable impedance having opposite ends thereof connected respectively to the remaining ends of said fixed impedances and having a movable contact connected to an opposite side of said source of biasing voltage, first circuit means for connecting a plate of a first of said tubes to the juncture between one of said fixed impedances and said second variable impedances, second circuit means for connecting a plate of a second of said tubes to the juncture between the other of said fixed impedances and said variable impedance, a second group of fixed impedances having ends thereof connected to an opposite end of said first variable impedance, a third variable impedance having its ends connected respectively to the remaining ends of said fixed impedances and having a movable contact connected to said opposite end of said source of biasing voltage, third circuit means for connecting the plate of a third of said tubes to the juncture between one of said fixed second group of said fixed impedance and said third variable impedance, and fourth circuit means for connecting the plate of a fourth of said tubes to the juncture of the other of said fixed impedance of said second group and said third variable impedance.

4. An arrangement for multiplying the magnitudes of two signals comprising a bridge circuit having four branches, a multielement space-discharge tube having at least a plate, a grid, and cathode connected in each of said branches, the grid of each tube connected to a cathode of an adjacent one of said tubes and to a juncture of said bridge circuit, a first circuit means for applying a first of said signals to grids of two of said tubes connected in two opposite branches of said bridge circuit, a second circuit means for applying a second of said signals to grids of two more of said tubes connected in the two remaining opposite branches of said bridge circuit, network means having an input and four outputs, each of said outputs being connected respectively to a plate of one of said tubes for application of biasing voltages to said plates, means included in said network means for adjusting the magnitude of biasing voltage applied to each of said plates for equalizing the conductivity characteristics of said tubes, and an output circuit connected between said first and second circuit means for development therein of a signal proportional to the product of said first and said second signals.

5. An arrangement for multiplying the magnitudes of two signals comprising a bridge circuit having four branches, a multielement space-discharge tube having at least a plate, grid, and cathode connected in each of said branches, the grid of each tube connected to a cathode of an adjacent one of said tubes and to a juncture of two adjacent branches of said bridge circuit, a first input transformer having a center tapped secondary, opposite ends of said secondary being connected to the grids of two of said tubes connected in opposite branches of said bridge circuit, a second input transformer having a center tapped secondary, opposite ends of said secondary being connected to apply a second of said signals to grids of the remaining two of said tubes connected in the two remaining opposite branches of said bridge circuit, a biasing network having at least one source of biasing voltage and four outputs, each of said outputs being connected respectively to a plate of one of said tubes for application of biasing voltage to said plates, means connected in said biasing network for adjusting the magnitude of biasing voltage to each of said plates for equalizing the conductivity characteristics of said tubes, and an output circuit connected between said center taps for development therein of a signal proportional to the product of said first and said second signals.

6. An arrangement for multiplying the magnitudes of two signals comprising a bridge circuit having four branches, a triode in each of said branches, each of said triodes being connected in series with a grid of each triode connected to a cathode of an adjacent one of said triodes for flow of current through each grid-cathode circuit and in the loop formed by said branches, means including a variable source of direct current connected to anodes of said triodes for substantially equalizing the operating characteristics of said triodes, a first circuit means for applying a first of said signals across one of the diagonals of said bridge and to the grids of two of said triodes, a second circuit means for applying a second of said signals to the other diagonal of said bridge and to the grids of the remaining two of said triodes, and an output circuit connected between said two circuit means.

7. In an electronic multiplier circuit for multiplying the magnitudes of two signals and comprising a bridge circuit having four terminals and four branches wherein each of the branches includes a nonlinear element having square-law, current-voltage characteristics, and all elements are connected in series, the improvement wherein at least the elements in two adjacent branches of said bridge circuit comprise space-discharge tubes each having at least a plate, a grid, and a cathode, the cathode of one of the tubes connected to the grid of the other of the tubes and each cathode connected to a terminal of said bridge, the current path through said tubes being by way of the grid-cathode circuit, means for rendering the conductivity characteristics of said tubes substantially equal, said means comprising a biasing circuit connected to the plates of said tubes for applying a potential thereto negative with respect to their associated cathodes, and means for varying the bias applied to the plates of said tubes for equalizing the conductivity characteristics of said tubes.

8. The circuit of claim 7 in which said biasing circuit comprises a variable impedance having a movable contact, a source of biasing voltage connected to said movable contact, a pair of impedance means each respectively connecting opposite ends of said variable impedances to an opposite side of said source of biasing voltage, and in which the plates of said tubes are connected intermediate the ends of said impedance means and said movable contact.

References Cited in the file of this patent
UNITED STATES PATENTS

| | | |
|---|---|---|
| 1,449,382 | Carson | Mar. 27, 1923 |
| 1,535,674 | McCaa | Apr. 28, 1925 |
| 2,040,341 | Schmierer | May 12, 1936 |
| 2,088,059 | Schulze-Herringen | July 27, 1937 |
| 2,173,910 | Van Der Mark et al. | Sept. 26, 1939 |
| 2,271,519 | Wolf | Feb. 3, 1942 |
| 2,428,541 | Bagley | Oct. 7, 1947 |
| 2,580,148 | Wirkler | Dec. 25, 1951 |

FOREIGN PATENTS

| | | |
|---|---|---|
| 853,324 | France | Nov. 28, 1939 |

UNITED STATES PATENT OFFICE
CERTIFICATE OF CORRECTION

Patent No. 3,021,074                      February 13, 1962

Goethe M. Groenendyke

It is hereby certified that error appears in the above numbered patent requiring correction and that the said Letters Patent should read as corrected below.

Column 3, line 37, Equation (9), for "$(e_d+E)^2=Ki_b$," read -- $(e_d+E)^2=Ki_d$ --; line 63, for "non linear" read -- non-linear --; column 4, line 22, for "In" read -- The --; line 54, after "by" insert -- the --; column 6, line 53, strike out "a", second occurrence.

Signed and sealed this 19th day of June 1962.

(SEAL)
Attest:

ERNEST W. SWIDER                            DAVID L. LADD
Attesting Officer                               Commissioner of Patents